US006879250B2

(12) United States Patent
Fayt et al.

(10) Patent No.: US 6,879,250 B2
(45) Date of Patent: Apr. 12, 2005

(54) FOR A MOTOR VEHICLE, AN OUTSIDE ELEMENT PROVIDING A CAPACITIVE SENSOR, AND A PIECE OF BODYWORK INCLUDING SUCH AN OUTSIDE ELEMENT

(75) Inventors: Arnold Fayt, Aromas (FR); Olivier Hilmarcher, Montreal la Cluse (FR); Sebastien Guyon, Montreal la Cluse (FR)

(73) Assignee: Compagnie Plastic Omnium, Lyons (FR)

( * ) Notice: Subject to any disclaimer, the term of this patent is extended or adjusted under 35 U.S.C. 154(b) by 142 days.

(21) Appl. No.: 10/115,070

(22) Filed: Apr. 4, 2002

(65) Prior Publication Data

US 2002/0158582 A1 Oct. 31, 2002

(30) Foreign Application Priority Data

Apr. 4, 2001 (FR) .......................................... 01 04600

(51) Int. Cl.⁷ ................................................ B60Q 1/00
(52) U.S. Cl. .................. 340/436; 340/435; 340/468; 340/434; 340/472.1; 340/480; 340/562; 150/154; 150/166; 280/29; 280/727; 280/762; 280/770; 362/510; 362/549
(58) Field of Search ................................ 340/436, 435, 340/434, 468, 472, 480, 562; 150/154, 166; 362/510, 549; 200/61.43, 61; 280/29, 727, 762, 770

(56) References Cited

U.S. PATENT DOCUMENTS

| 3,716,445 A | * | 2/1973 | Lemelson | 428/166 |
| 4,488,745 A | * | 12/1984 | Stokes | 293/155 |
| 4,546,840 A | * | 10/1985 | Yukishige et al. | 200/61.44 |
| 4,951,985 A | * | 8/1990 | Pong et al. | 200/61.43 |
| 5,394,292 A | * | 2/1995 | Hayashida | 340/435 |
| 5,672,405 A | * | 9/1997 | Plank et al. | 428/133 |
| 5,801,340 A | | 9/1998 | Peter | |

FOREIGN PATENT DOCUMENTS

| EP | 0110631 | * 11/1983 |
| EP | 0 952 046 A2 | 10/1999 |
| GB | 2 348 505 A | 10/2000 |
| WO | WO 89/08352 | 9/1989 |

* cited by examiner

Primary Examiner—Jeffery Hofsass
Assistant Examiner—Daniel Previl
(74) Attorney, Agent, or Firm—Oliff & Berridge, PLC

(57) ABSTRACT

The invention relates to an outside element for a motor vehicle, the element being designed to be fitted to the vehicle, e.g. on its bodywork, and comprising an essentially non-conductive protective screen (3), the element being characterized in that behind said protective screen if further comprises an electrically insulating film having two faces, each of which is covered at least in part in an electrically conductive material. The invention also provides a piece of bodywork provided with such a conductive element.

12 Claims, 3 Drawing Sheets

FOR A MOTOR VEHICLE, AN OUTSIDE ELEMENT PROVIDING A CAPACITIVE SENSOR, AND A PIECE OF BODYWORK INCLUDING SUCH AN OUTSIDE ELEMENT

BACKGROUND OF THE INVENTION

1. Field of Invention

The present invention relates to an outside element for a motor vehicle, the element providing a capacitive sensor, and the invention also provides a piece of bodywork including such an outside element.

2. Description of Related Art

In the state of the art, devices are already known for providing driving assistance on the basis of ultrasound radar.

Such devices provide good results but they are relatively expensive given their great complexity. That is why they are to be found almost exclusively on top-of-range vehicles only.

In addition, they are unsightly insofar as the radar transceiver must have a clear field of view in order to be able to operate. Given that such transceivers are generally housed in bumper shields, that requires the bumpers to be pierced, which gives rise to a certain amount of difficulty in organizing the appearance of the vehicle, and also to a certain amount of fragility for the sensors.

Furthermore, ultrasound sensors are relatively heavy at present and they provide a detection envelope that is not very uniform.

There is another artificial vision technique which makes it possible to detect movements of obstacles that might exist in the vicinity of a vehicle: detection by means of a capacitive sensor.

In that technique, an antenna is placed on the vehicle bumper so as to form a capacitor with each object around it, and thus in particular with any obstacles with which the vehicle might come into contact.

The distance between the antenna and each such object is one of the factors which determines the capacitance of the capacitor formed in this way. Consequently, by using electronic means to measure this capacitance it is possible to calculate the distance between the antenna and the object, or at least whether said distance is increasing or decreasing by measuring variations in the capacitance of the capacitor.

However, the difficulty with that technique lies in how the antenna is to be positioned on a piece of bodywork.

SUMMARY OF THE INVENTION

An object of the invention is to propose a novel way of installing a capacitive proximity-sensing antenna that is simple and inexpensive to make and to install on a vehicle, while making full use of its capacitive sensor function.

To this end, the invention provides an outside element for a motor vehicle, for fitting onto the vehicle, e.g. onto its bodywork, the element comprising an essentially non-conductive protective screen and being characterized in that behind said protective screen it further comprises an electrically insulating film having two faces, each of which is coated at least in part in an electrically conductive material.

In the meaning of the present invention, the term essentially non-conductive protective screen is used to mean a screen which, firstly is made of a material that is electrically non-conductive, and secondly has not been subjected to treatment for giving it electrical conduction properties.

An example of treatment that could impart properties of electrical conductivity to an initially non-conductive screen is that of electrostatically painting parts made of plastics material. Such parts, which are initially non-conductive, are coated with a conductive primer which ensures that electrically charged particles of paint sprayed onto said parts adhere thereto.

Consequently, in order to be considered as being essentially non-conductive, in the meaning of the invention, a colored protective screen must have been painted using a non-electrostatic painting technique, or be bulk-dyed, or be covered in an overmolded decorative film that is likewise non-conductive.

In the invention, the film carrying a conductive material on both faces constitutes a conductive antenna which, in association with an electronic device for measuring capacitance, acts as a capacitive sensor. Associated with the protective screen, this sensor forms an element which can be fitted onto various locations of a vehicle.

In a particular embodiment of the invention, the protective screen is made of plastics material.

This screen can constitute a protective capping strip for fitting onto a side door, onto a rear door, or onto a bumper shield, so as to warn of bumps against those portions of the vehicle.

For ornamental purposes, and depending on the style of the vehicle, the plastics material can be selected to be transparent or translucent so as to leave the film carrying the two layers of conductive material visible.

Under such circumstances, it is advantageous for at least the face of the film that is visible from the outside to carry the electrically conductive material in the form of an open-work pattern, preferably a regular pattern, giving the film as seen through the transparent or translucent screen a decorative function marking the style of the vehicle and possibly emphasizing the presence of the capacitive sensor on the vehicle.

The particular open-work pattern that is selected can be determined by technical requirements, given the desired efficiency for the antenna, and by decorative requirements, in order to obtain a particular decorative appearance.

In addition, the fact of the conductive material forming an open-work pattern serves to save material, since such material is potentially quite expensive, without that harming the efficiency of the sensor, since a continuous layer of conductive layer would in any event be of no use for the intended function.

The conductive material can be a conductive ink or any other conductive material selected as a function of the conductivity properties required for the intended application.

The conductive material can be deposited by silkscreen printing on at least one of the faces of the film, and a varnish can be added to cover it and to protect it.

In the invention, the transparent plastics material can be a methacrylate, a polypropylene, or a polycarbonate.

In another embodiment of the invention, the plastics material is opaque.

It can then retain its initial color or it can be bulk-dyed, which is generally compatible in terms of appearance with it being used as a protective strip for the bumper shield.

In a particular embodiment of the invention, the electrically insulating film is made of a thermoplastic polyester. By way of example, the polyester can be that sold by General Electric Plastics under the trademark VALOX FR-1.

Said film can be shaped by thermoforming to have a particular geometrical configuration corresponding to the protective screen.

Depending on the location of the element on the vehicle, various ways of fixing the film and the protective screen can be envisaged.

The film can thus be fixed to the protective screen or it can be fixed directly to the vehicle, with the protective screen being fixed to the vehicle over the film.

The film can be fixed on the protective screen by a suitable arrangement of the screen that leaves a narrow gap between the inside wall and the vehicle, with the film being sandwiched therein and remaining plane because of its own stiffness.

The film can also be stuck or heat-sealed to the inside wall of the protective screen.

Another possibility is to overmold the protective screen onto the film.

Other fastening means could also be envisaged, for example such as giving particular shapes to the screen, such as tongues when the screen is opaque.

The invention also provides a piece of bodywork including an element as described above.

BRIEF DESCRIPTION OF THE DRAWINGS

The invention will be better understood on reading the following description given purely by way of example and made with reference to the accompanying drawings, in which.

DETAILED DESCRIPTION OF EXEMPLARY EMBODIMENTS

Figure 1:
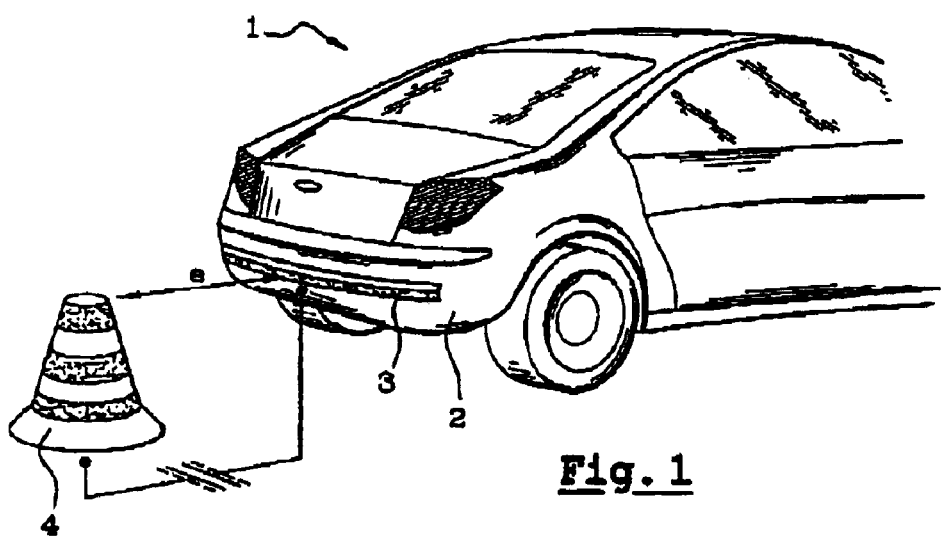
FIG. 1 is a three-fourths rear view of a motor vehicle fitted with an outside element of the invention.

As shown in FIG. 1, a motor vehicle 1 has a rear shield 2 provided with a protective strip of capping 3.

The vehicle is reversing towards a cone 4 situated at a distance e from the closest point on the vehicle, i.e. the capping 3.

Figure 2:
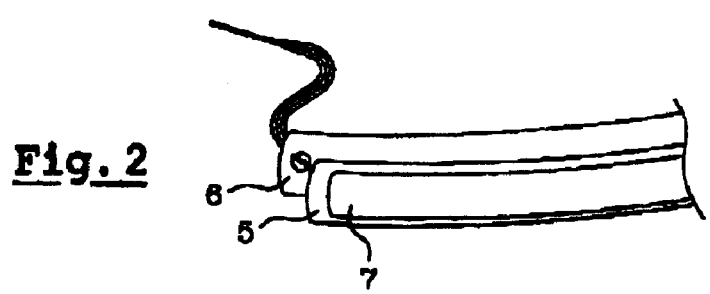
FIG. 2 is a diagrammatic exploded view of an antenna incorporated in an outside element of the invention.

The capping 3 constitutes a protective screen in the meaning of the invention, i.e. it covers an antenna of the kind shown in FIG. 2.

The antenna comprises an electrically insulating film 5, e.g. made of VALOX FR-1 (trademark in the name of GE Plastics) covered on each of its two faces in an electrically conductive material 6, 7, e.g. a conductive ink.

On the inside, i.e. on its side directed towards the passenger compartment of the vehicle when the capping 3 is in place, the film 5 is covered by conductive ink covering its entire surface 6, while on the outside, i.e. its side facing towards the capping, the film is covered in conductive ink in its central portion 7 only.

The precise shape of this central portion 7 is easily determined by the person skilled in the art as a function of the desired antenna characteristics.

Figure 7:
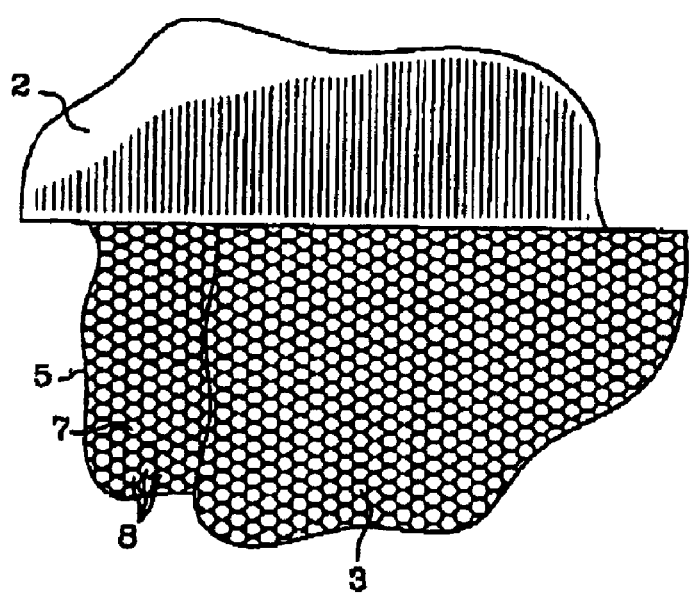
FIG. 7 is a close-up view of the shield and the capping of FIG. 1.

The covering of conductive ink is not constituted by a continuous layer but presents an open-work pattern forming an array, as can be seen in FIG. 7 where the capping 3 is transparent. In the example of FIG. 7, the openings 8 in the pattern are circular orifices situated at the nodes of a regular array having a triangular mesh, thereby not only reducing the quantity of ink needed to implement the antenna, but also co-operating with the transparent capping 3 to provide a decorative function.

Different appearances can thus be obtained by selecting capping 3 that is transparent or translucent, colored or not, a film 5 that is tinted, and a particular pattern made using an optionally-colored conductive material.

Figure 3:
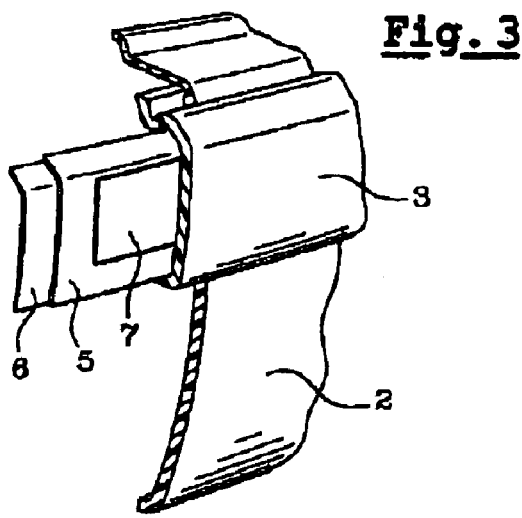
FIG. 3 is a partially cutaway perspective view of the rear shield and the outside element for a vehicle as shown in FIG. 1, showing the antenna of FIG. 2 in place.

In the examples of FIGS. 3 and 7, the film 5 extends between the capping 3 and the shield 2 merely by means of its own stiffness, its outline being adapted to the narrow volume left empty between said capping and said shield.

Figure 4:
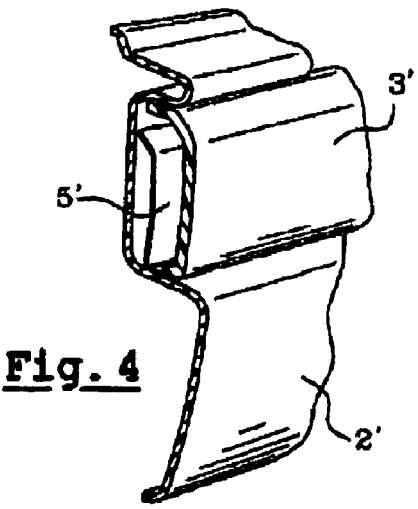
FIGS. 4 to 6 are views analogous to FIG. 3 showing various ways in which the film and the protective screen can be fixed relative to each other and to the shield.

In the example of FIG. 4, the film 5' is stuck to the inside face of the capping 3', which is preferably opaque and projects from the shield 2' so as to serve as capping that provides protection against bumps. Such capping is often bulk-dyed.

Figure 5:
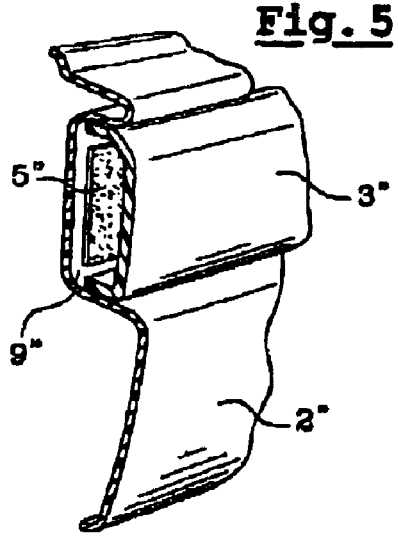

In the example of FIG. 5, the film 5" is stuck to the shield 2" in the bottom of a groove 9" formed to receive the capping 3". In this case, the capping can be transparent.

Figure 6:
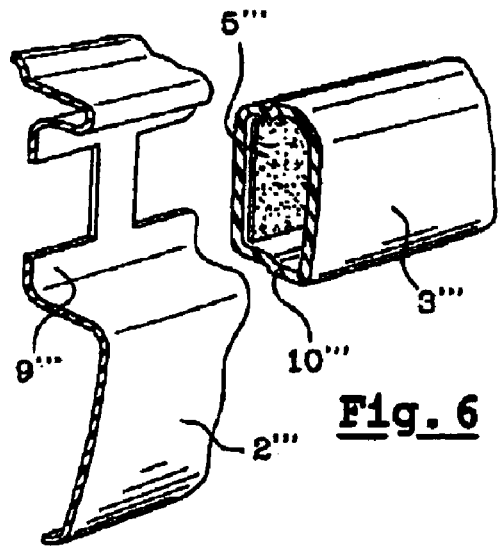

In the example of FIG. 6, the shield 2''' has a groove 9''' for receiving a longitudinal housing 10''' made up of one or two parts, the outside portion thereof serving as capping 3''' and the inside portion thereof supporting the film 5'''. This longitudinal housing 10''' presents the advantage of providing leakproofing against the outside so as to protect the antenna-constituting film.

Other ways of fixing the film and the capping can equally well be envisaged by the person skilled in the art.

What is claimed is:

1. An element for a motor vehicle for fitting onto an outside surface of the vehicle the element comprising:
    an essentially non-conductive capping for fitting onto a side door, a rear door, or a bumper shield of the vehicle; and
    an electrically insulating film situated behind said capping, and having two faces, each of which is coated at least in part with an electrically conductive material;
    wherein the element forms a capacitor with any obstacles with which the vehicle might come into contact to determine whether a distance between the vehicle and the obstacles is increasing or decreasing.

2. An element according to claim 1, in which the capping is made of a plastic material.

3. An element according to claim 2, in which the plastic material is transparent or translucent.

4. An element according to claim 3, in which the plastic material is a methacrylate, a polypropylene, or a polycarbonate.

5. An element according to claim 2, in which the plastic material is opaque.

6. An element according to claim 5, in which the plastic material is colored by being bulk-dyed, by non-electrostatic painting, or by overmolding a film.

7. An element according to claim 1, in which the electrically insulating film is made of a thermoplastic polyester.

8. An element according to claim 1, in which the electrically conductive material forms an open-work pattern, at least on one face.

9. An element according to claim 1, in which the film is shaped by thermoforming to have a particular geometrical configuration corresponding to the capping.

10. An element according to claim 1, in which the film is fixed to capping.

11. An element according to claim 1, in which the film is fixed directly to the vehicle, and in which the capping is likewise fixed directly to the vehicle, over the film.

12. A piece of bodywork, in particular a door panel, a rear door panel, or a bumper shield, including an outside element according to claim 1.

* * * * *